Figure 1:
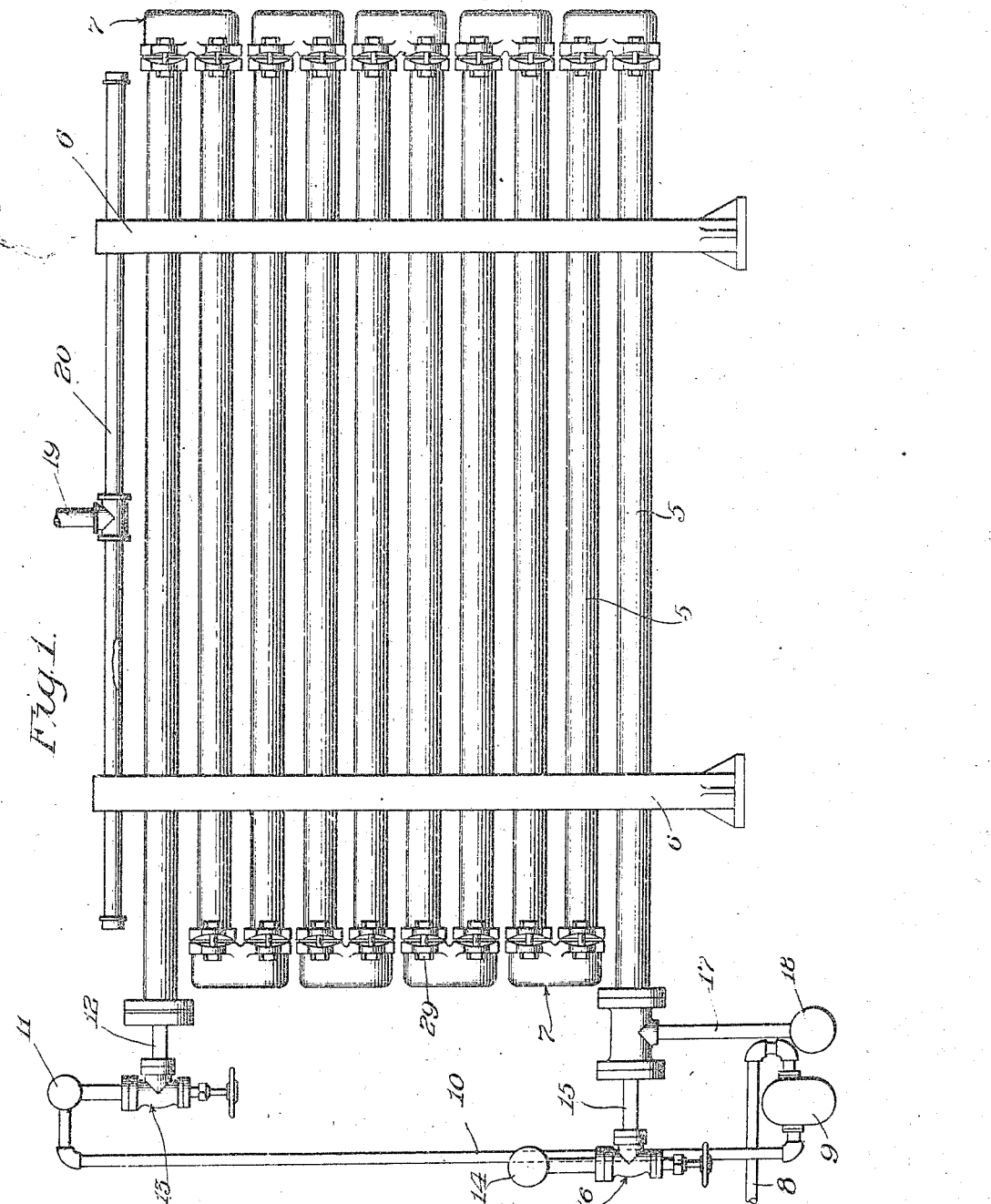

C. W. VOGT.
AMMONIA ABSORBER.
APPLICATION FILED JUNE 1, 1914.

1,149,005.

Patented Aug. 3, 1915.
2 SHEETS—SHEET 1.

Witnesses:
Harry S. Gaither
Rose Levitsky

Inventor:
Clarence W. Vogt
by
Attys.

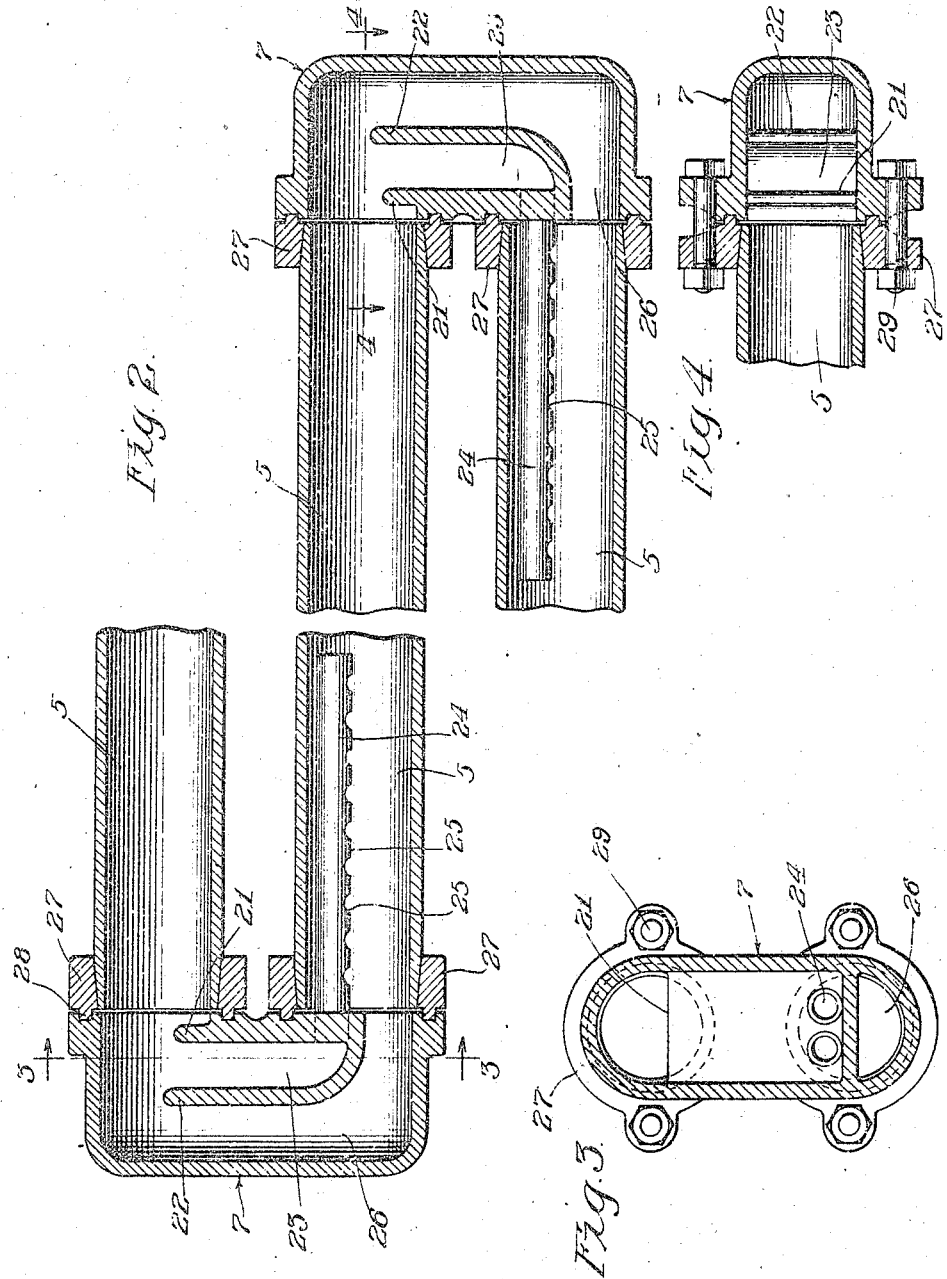

UNITED STATES PATENT OFFICE.

CLARENCE W. VOGT, OF LOUISVILLE, KENTUCKY.

AMMONIA-ABSORBER.

1,149,005.  Specification of Letters Patent.  Patented Aug. 3, 1915.

Application filed June 1, 1914. Serial No. 842,285.

*To all whom it may concern:*

Be it known that I, CLARENCE W. VOGT, a citizen of the United States, residing at Louisville, in the county of Jefferson and State of Kentucky, have invented certain new and useful Improvements in Ammonia-Absorbers, of which the following is a specification.

The present invention has reference to certain improvements in ammonia absorbers, that is machines whose function and object is to bring water into contact or association with ammonia so that the water will absorb the ammonia gas to produce the concentrated liquor.

While it is true that ammonia gas has a very strong affinity for water, so that a given volume of water is capable of absorbing a very large volume of the gas, still it is desirable to so construct the ammonia absorber that the water and gas will be intimately brought together, thereby improving the absorption and permitting a larger quantity of the concentrated liquor to be produced in a given time in a machine of given size. In other words, it is desirable to so construct the machine that the water, or weak liquor, and the gas will be intimately associated so as to increase the rate of absorption in a machine of given size.

The main object of the invention is to accomplish the foregoing desirable results by so constructing the machine that the water or weak liquor and the gas will be brought into contact with each other by a countercurrent flow, that is a flow in which the liquor is traveling in one direction, while the gas is traveling in the opposite direction, the gas and liquor being in contact with each other.

In this connection another object is to so construct the machine that at periodic intervals during the counter-current flow the liquor will be jetted or sprayed into the body of the gas, so as to still further insure the intimate contact of the liquor and gas.

Other objects of the invention have reference to the simplification of the construction of the machine, and in general the provision of a construction such that the parts may be readily manufactured, and will be strong and permanent in service.

Other objects and uses of the invention will appear from a detailed description of the same which consists in the features of construction and combinations of parts hereinafter described and claimed.

In the drawings: Figure 1 shows a side elevation of a construction of ammonia absorber which embodies the features of my invention; Fig. 2 shows an enlarged sectional detail through certain of the pipes of the absorber, and through the corresponding headers, the central portions of the pipes being broken away so as to shorten up the figure; Fig. 3 shows a section taken on the line 3—3 of Fig. 2 looking in the direction of the arrows; and Fig. 4 shows a section taken on the line 4—4 of Fig. 2 looking in the direction of the arrows.

The absorber illustrated in the drawings comprises essentially a plurality of horizontally, or substantially horizontally, mounted pipes 5, and the same are conveniently illustrated as being supported by the upright stands or brackets 6. These pipes are connected up in series with each other by headers 7, the headers being so connected in to the pipes that the gas and liquor will have to flow through the entire series from one end to the other. The incoming gas enters the lowermost pipe and circulates back and forth while traveling upward, while the water or weak liquor enters the uppermost pipe and circulates back and forth while traveling downward in opposition to the travel of the gas. As the gas travels upward it is absorbed by the water or liquor so that at the upper end of the absorber there is practically no free or unabsorbed gas left.

The water or weak liquor may be introduced into the upper end of the absorber in any convenient manner, and likewise the fresh gas may be introduced into the lower end of the absorber in any convenient manner. As a convenient arrangement I have shown the water or weak liquor as coming from the supply pipe 8, passing thence through a regulator 9 and upward through a pipe 10 to a weak liquor inlet header 11. From this header it passes into the uppermost pipe by a connection 12 under the control of a globe valve 13. I have conveniently illustrated the ammonia gas as being supplied from a return gas header 14, passing downward through a connection 15 and into the lower end of the absorber under the control of another globe valve 16. I have also conveniently illustrated the rich liquor as being delivered from the lower end of the absorber through a connection 17 and into the rich liquor header 18. If desired, the absorber may be cooled by a spray or jet of water which is allowed to trickle down over the outside surfaces of the pipes 5, said water being supplied by a pipe 19 to a distributing pipe 20 which has a plurality of perforations along its under side.

The foregoing described construction is such that a counter-current flow of the gas and liquor will be produced. I shall now proceed to describe a header construction such that a very perfect mingling or contacting of the liquor and gas will be produced at frequent intervals during the travel of these constituents in their counter-current relationship. As the water or liquor travels along each of the pipes it lies by gravity on the lower surface thereof, and in like manner the free or unabsorbed ammonia gas rises and occupies the upper portion of each of the pipes. It is desired to counteract this tendency periodically so as to force the gas and liquor to mix with each other. For this purpose each of the headers is provided with a weir 21 which controls or regulates the depth of the liquor as it lies in the pipe and with another weir 22 which receives the liquor as it overflows the weir 21 and directs it down into a pocket or the like 23 of the header. From this pocket the liquor can gain access to the next succeeding pipe only by way of one or more tubes 24 which extend longitudinally into the succeeding pipe, and if desired, these tubes 24 may be provided with perforations 25 in their lower surfaces so as to spray the liquor as it enters the pipe. The upflowing gas, by reason of the fact that it occupies the upper portion of the pipe into which the tubes 24 project, will surround said tubes and be brought into intimate contact with the descending liquor as the same is sprayed from the tubes 24. Whatever gas is left over and unabsorbed will pass up into the next pipe 5 of the series by way of a passage 26 in the header, so that the action will be repeated in said pipe. It thus follows that as the liquor and gas pass through each of the headers in counter-current flow an intimate mixing or association will occur so that a very greatly increased absorption can be secured in a machine of given size.

As a convenient detail of construction each end of each of the pipes 5 is provided with a collar or the like 27 having a tongue 28, which tongue is adapted to seat into a slot or groove of the corresponding header, the header being drawn solidly toward the collar by means of bolts 29.

In view of the fact that the pipes of the absorber disclosed in the present application are only partially filled with liquor, the liquor overflowing from each pipe into the one immediately below it, it follows that there is practically no static head or pressure on the liquid; whereas in that type of absorber in which the pipes are entirely filled with liquor, there is a static head or pressure on the liquor in the lowermost pipes which depends in amount upon the vertical height of the absorber. It, therefore, follows that, by breaking up the liquor stream in such a manner that each pipe is only partially filled, the liquor overflowing from each pipe into the one next beneath it, any disadvantages or objections to a large static head are overcome or done away.

While I have herein shown and described only a single form of construction which embodies the features of my invention, still it will be understood that I do not limit myself to this single construction, except as I may do so in the claims, but that I include within the scope of my invention any equivalent construction operating in an equivalent manner to produce equivalent results.

I claim:

1. In a gas absorbing apparatus the combination of a plurality of horizontally disposed absorption pipes, heads connecting the ends of said pipes alternately together for the purpose of placing the pipes in series with each other, each head connecting pipe end portions which are in vertical alinement, each head being provided with a vertical pocket extending from the lower portion of the upper pipe to the upper portion of the lower pipe and adapted to receive absorbing liquid flowing along the lower surface of the upper pipe, and a discharge tube connected to the lower portion of each pocket and adapted to discharge the absorbing liquid into the upper portion of the lower pipe, each head being provided with another passage for gas connecting the lower portion of the lower pipe with the upper portion of the upper pipe.

2. In a gas absorbing apparatus the combination with a plurality of horizontally disposed absorption pipes lying in vertical alinement, of heads connecting the end portions of alternate pairs of pipes to place the pipes in series with each other, each head being provided with a vertical pocket for absorbing liquid extending from the lower portion of the upper pipe to the upper portion of the lower pipe, the portion of the pocket adjacent to the upper pipe being provided with a weir for limiting the depth of absorbing liquid in the upper pipe, and a discharge tube connected to the lower portion of the pocket and extending into the upper portion of the lower pipe to deliver absorbing liquid therein, and each head being provided with a gas passage connecting the lower portion of the lower pipe with the upper portion of the upper pipe.

3. The combination with a plurality of horizontally disposed absorption pipes lying substantially in the same vertical plane, of heads connecting alternate pairs of pipe ends to place the pipes in series with each other, each head having a vertical pocket extending from the lower portion of the upper pipe to the upper portion of the lower pipe, there being a weir between each pocket and the end portion of the corresponding upper pipe, for the purpose of limiting the depth of absorbing liquid in the upper pipe, and a liquid discharge tube connected to the lower portion of each pocket for the purpose of delivering absorbing liquid into the upper portion of the pipe, each tube being provided with a plurality of discharge openings in its lower surface for distributing the absorbing liquid as the same is discharged into the lower pipe, and there being a gas passage in each head connecting the lower portion of the lower pipe with the upper portion of the upper pipe.

4. As a new article of manufacture a head of the class described provided with upper and lower openings for connection to absorption pipes, there being a vertical pocket within the head extending from the lower portion of the upper opening to the upper portion of the lower opening, a discharge tube connected into the lower portion of said pocket, and a gas passage within the head connecting the lower portion of the lower opening with the upper portion of the upper opening.

5. As a new article of manufacture a head of the class described having the upper and lower openings adapted for registration with absorption pipes, there being a pocket for absorbing liquid in the head extending from the lower portion of the upper opening to the upper portion of the lower opening, a weir interposed between the upper portion of said pocket and the lower portion of the upper opening for the purpose of controlling the depth of absorbing liquid in the upper pipe, a passage tube connected to the lower portion of the pocket and adapted to deliver absorbing liquid into the upper portion of the lower pipe, and a gas passage connecting the lower portion of the lower opening with the upper portion of the upper opening.

C. W. VOGT.

Witnesses:
 DAN NEWELL,
 R. HODGES.